T. C. JOHNSON AND F. L. HUMISTON.
BOX MAGAZINE.
APPLICATION FILED MAY 7, 1919.
1,323,063.
Patented Nov. 25, 1919.
4 SHEETS—SHEET 1.
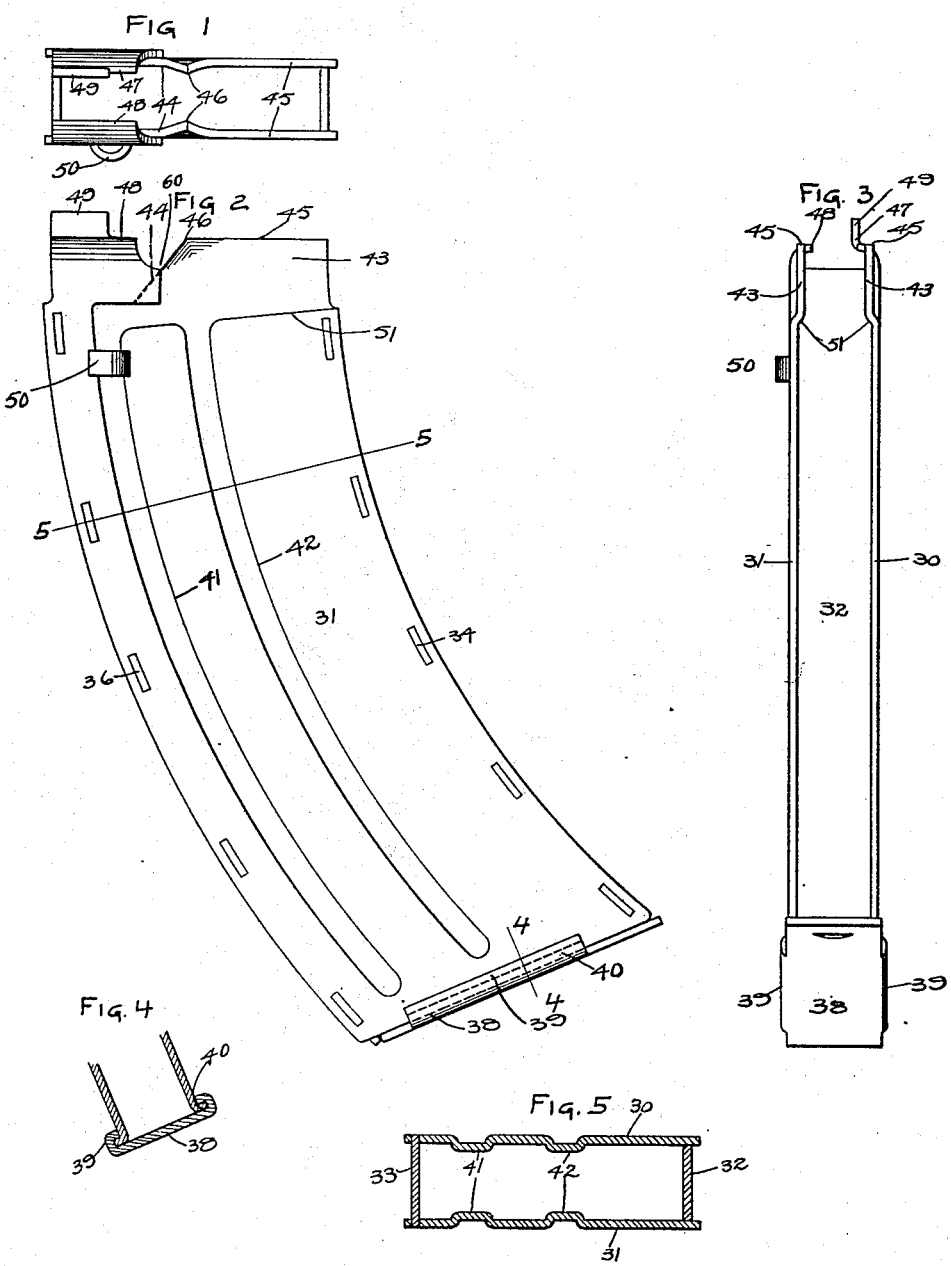

T. C. JOHNSON AND F. L. HUMISTON.
BOX MAGAZINE.
APPLICATION FILED MAY 7, 1919.

1,323,063.

Patented Nov. 25, 1919.
4 SHEETS—SHEET 2.

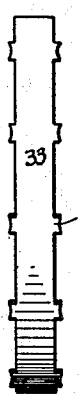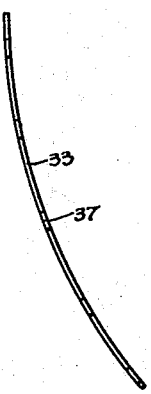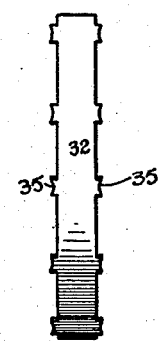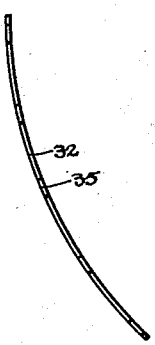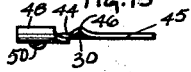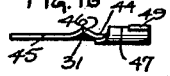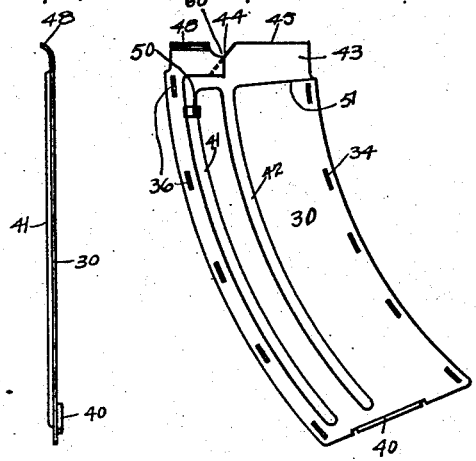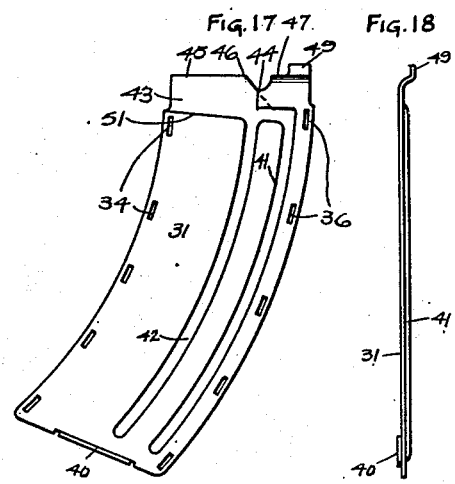

T. C. JOHNSON AND F. L. HUMISTON.
BOX MAGAZINE.
APPLICATION FILED MAY 7, 1919.

1,323,063.

Patented Nov. 25, 1919.
4 SHEETS—SHEET 4.

Inventors
Thomas C. Johnson
Frederick L. Humiston
by Seymour Earle
Atty.

UNITED STATES PATENT OFFICE.

THOMAS C. JOHNSON AND FREDERICK L. HUMISTON, OF NEW HAVEN, CONNECTICUT, ASSIGNORS TO WINCHESTER REPEATING ARMS CO., OF NEW HAVEN, CONNECTICUT, A CORPORATION.

BOX-MAGAZINE.

1,323,063.   Specification of Letters Patent.   Patented Nov. 25, 1919.

Application filed May 7, 1919. Serial No. 295,264.

*To all whom it may concern:*

Be it known that we, THOMAS C. JOHNSON and FREDERICK L. HUMISTON, citizens of the United States, residing at New Haven, in the county of New Haven and State of Connecticut, have invented a new and useful Improvement in Box-Magazines; and we do hereby declare the following, when taken in connection with the accompanying drawings and the characters of reference marked thereon, to be a full, clear, and exact description of the same, and which said drawings constitute part of this application, and represent, in—

Figure 1 a top or plan view of a box magazine constructed in accordance with our invention.

Fig. 2 a side view of the same.

Fig. 3 a front view.

Fig. 4 a sectional view on the line 4—4 of Fig. 2.

Fig. 5 a sectional view on the line 5—5 of Fig. 2.

Figure 6:
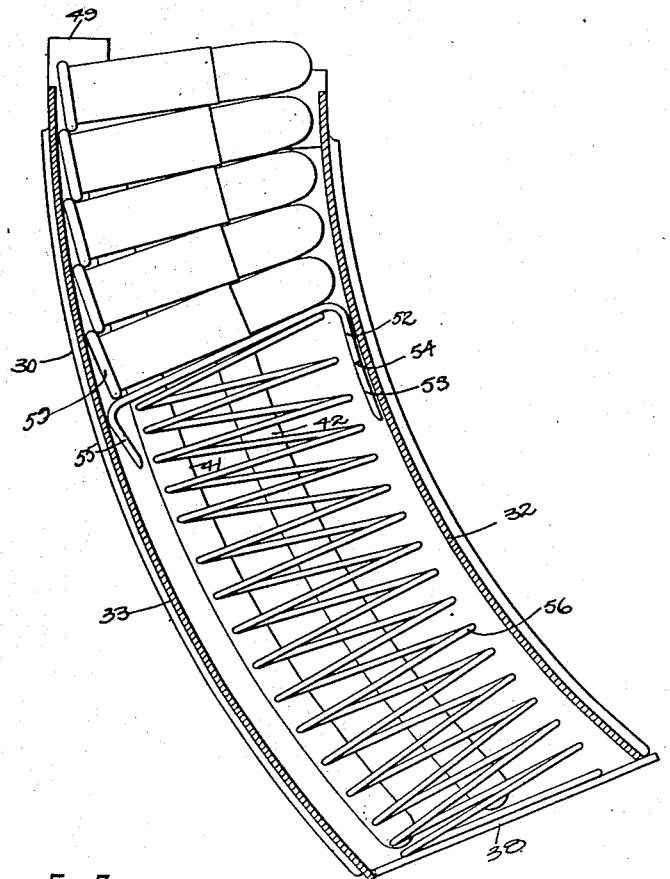

Fig. 6 a longitudinal sectional view showing a series of cartridges in position.

Figure 7:
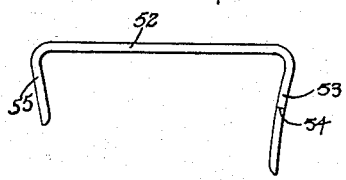

Fig. 7 a side view of the follower, detached.

Figure 8:
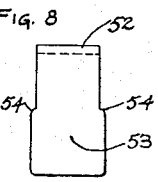

Fig. 8 a front view of the follower.

Fig. 9 a rear face view of the rear wall.

Fig. 10 a side view of the same.

Fig. 11 a rear face view of the front wall.

Fig. 12 a side view of the same.

Fig. 13 a top view of the right hand side wall, detached.

Fig. 14 an edge view of the same.

Fig. 15 a side view of the same.

Fig. 16 a top or plan view of the left hand side wall.

Fig. 17 a side view of the same.

Fig. 18 an edge view of the same.

Figure 19:
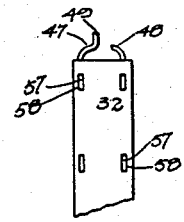

Fig. 19 a rear view of the upper part of a box magazine illustrating a modified form of our invention.

Figure 20:
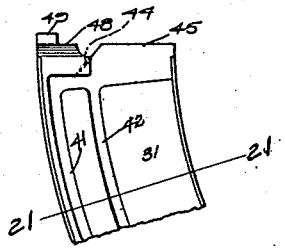

Fig. 20 a side view of the same.

Figure 21:
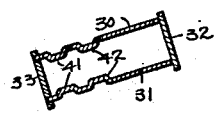

Fig. 21 a sectional view on the line 21—21 of Fig. 20.

Figure 22:
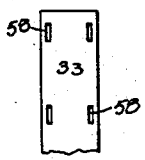

Fig. 22 a face view of the upper end of the rear wall, detached.

Figure 23:
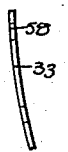

Fig. 23 a side view of the same.

Figure 24:
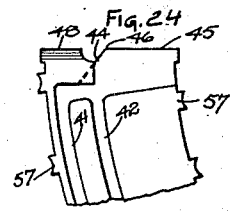

Fig. 24 a side view of the upper part of the right hand side wall, detached.

Figure 25:
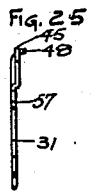

Fig. 25 an edge view of the same.

Figure 26:
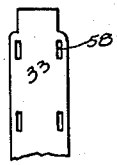

Fig. 26 a face view of the upper end of the front wall, detached.

Figure 27:

Fig. 27 an edge view of the same.

This invention relates to an improvement in box-magazines for firearms, particularly to magazines for short rim cartridges. In feeding these cartridges from the magazine to the chamber of the barrel of the arm, it is essential that they be so presented to the chamber as to enter in the line of the axis of the chamber to avoid mutilation of the bullet. It is also essential that the magazine be so constructed as to permit the follower to raise the column of cartridges smoothly and surely each time that the top cartridge is expended. On account of the relatively much greater diameter of the head as compared with the body of the cartridge, and on account of the fact that the cartridges must lie in the magazine so that the lower edge of the rim of each is immediately in front of the upper edge of the rim of the next cartridge below, the lower cartridges of the column lie with an increasing upward tilt of the forward end as more and more are inserted into the magazine. Hence with a column of ten or more of such in a straight walled magazine the tilt of the follower becomes so great that the pressure of the follower spring becomes transferred to the front wall instead of tending to lift the cartridges. We have discovered that if the box be curved downwardly and forwardly according to the geometrical form defined by a column of cartridges lying so that the lower edge of the rim of each is immediately in front of the upper edge of the rim of the next lower cartridge and also bears against the body of the shell thereof and at the same time, the forward ends are in contact, the cartridges will all make about the same angle with the front and back walls of the magazine and the follower will move smoothly and surely, lifting the column of cartridges with certainty in such a way that each cartridge is presented to the loading mechanism at the top of the magazine in the same position. We are thus enabled to construct a box magazine for small rim cartridges which will function certainly and smoothly with a longer column of cartridges than any heretofore made; and which will also handle with certainty and smoothness the twenty-two short rim fire cartridge. We have found that the curve thus defined does not differ appreciably from an arc of a circle, and that when the magazine is in position in the arm the center of this circle is most advantageously located in the plane defined by the upper edges of the box, although the magazine will still function if this center be located as far from this plane as one-fourth of the radius of the circle. We have found, also, that the smooth functioning is more closely dependent upon accurate curvature than upon the location of the center of curvature and that for the twenty-two caliber short rim fire cartridge the concentric radii of the front and rear walls should not differ much from 3.4 and 4.2 inches respectively. Furthermore, in such a magazine it is necessary that the follower shall provide a bearing for both ends of the lowermost cartridge and be so constructed that when the lowermost cartridge is to be presented to the bolt it will rock so as to lift the rear end of the cartridge. For various reasons, and among others, to prevent jamming by reason of lint and other foreign substances, it is desirable that the dimensions of the magazine should be somewhat larger than the length and diameter of the shell to be used therewith.

The object of this invention is to provide a magazine which will function advantageously particularly with the small sizes of cartridges, and the invention consists in the contruction hereinafter described and particularly recited in the claims.

In carrying out our invention, we employ two side walls 30 and 31, a front wall 32, and rear wall 33. As clearly shown in Figs. 15 and 17 of the drawings these side walls 30 and 31 are formed near their forward edges with slots 34 to receive swallow-tail lugs 35 formed in the sides of the front wall 32 and the sides are formed near their rear edge with slots 36 to receive swallow-tail lugs 37 integral with, and projecting from the sides of the rear wall 33, these lugs extending through the said slots in which they are upset after assembling for riveting the pieces together and connect the side walls and form a box, the lower end of which is closed by a bottom 38, the edges 39 of which are rolled over flanges 40 formed at the lower ends of the side walls 30 and 31, these rolled edges forming finger grips on opposite sides of the lower end of the box magazine. The side walls are inwardly struck to form parallel ribs 41 and 42. It may here be stated that the front and rear walls of the box magazine form concentric curves from the upper end downward and forward, the curvature forming a segment of a circle the center of which lies in substantially the same plane as the upper edges of the said side walls or within one-quarter of their radii from such a plane, and the internal ribs 41 and 42 are concentric with the rear and front walls. The forward portions 43 of the upper ends of the side walls are set inwardly to form a contracted mouth at the upper end of the box magazine, and to form internal shoulders 51 for preventing the follower from rising beyond a predetermined position, as will hereinafter appear, and also to provide sloping cartridge-head guides 44, the points 46 formed by the angle of the inclined guides 44 and the upper edge 45 of the side walls forming edges on which the head of the uppermost cartridge rides as it is discharged from the magazine. The rear portions of the upper ends of the side walls are inwardly curved forming retaining flanges 47 and 48, the flange 47 being formed with an ejector shoulder 49 against which the extracted shell will contact when withdrawn from the chamber of the barrel. Between the forward portions 43 of the upper edges of the side-walls and the retaining-flanges 47 and 48 forming the rear portions of the upper edges of the side-walls I form vertical combined feeding and loading notches 60 located opposite each other. The forward edges of these notches are formed by the forwardly and upwardly inclined guides 44 which serve to elevate the cartridges as their rims are pushed forward from under the said retaining flanges 47 and 48, at which time the rims of the cartridges enter the said notches preparatory to the elevation of the heads of the cartridges by the guides 44. The said notches 60 not only permit the cartridges to be successively fed out of the mouth of the magazine, but also permit the magazine to be charged, since they permit the heads of the cartridges to be inserted by a hook-like movement under the retaining-flanges 47 and 48, which overhang the rear end of the mouth of the magazine. Whatever the detailed construction of the magazine, its mouth must at its rear end be narrow enough to confine the heads of the cartridges while its forward end must be wide enough to permit the bodies of the cartridges to rise through it. Furthermore, the forward end of the mouth of the magazine must be constricted as compared with the notches 60 which are provided for releasing the heads in the feeding of the cartridges from the magazine as well as introducing the heads in loading the magazine. These notches as shown, and preferably, are located just to the rear of the longitudinal center of the mouth of the magazine. As shown, they are produced by cutting the side-walls of the magazine as described though the mode of their production is not an essential part of my invention. The side wall 31 is also formed near its top with a locking stop 50 which is struck out from the metal of the side wall crossing the rib 41 in that wall. Within the box magazine is a follower 52 formed from a strip of metal with a downwardly projecting front arm 53 the lower end of which is made somewhat wider than the bearing face of the follower to form shoulders 54 which will engage with the shoulders 51 to prevent the follower from rising too high in the magazine. Preferably and as shown, the rear end of the follower is formed with a guide arm 55. As herein shown this arm is bent inward so as not to bear throughout its length against the rear wall of the magazine, and the arm 53 is preferably curved corresponding to the front wall of the magazine over which it rides. Within the magazine is a spring 56 bearing against the under face of the follower and against the bottom 38 the tendency of the spring being to force the follower upward and hence lift the column of cartridges thereon. While we prefer to form the side walls of the magazines with slots and the front and rear walls with lugs, it is obvious that this arrangement might be reversed and, as shown in Figs. 22 and 24 of the drawings, the front and rear edges of the sides may be formed with lugs 57 to enter slots 58 formed in the front and rear walls. In this case the front and rear walls project beyond the side walls instead of the reverse thereof as described and shown in Fig. 5 of the drawings. A column of cartridges is placed in the magazine in the usual way, the lowermost cartridge resting upon the follower and the rims 59 standing in rear of the ribs 41 by which they are guided, the uppermost cartridge being held by the flanges 47 and 48. When the uppermost cartridge is pushed forward by the bolt of the gun, the rim of the head rides up the incline 44 and over the shoulders 46, thus clearing the flanges 47 and 48 and being free to be advanced by the bolt, the next cartridge coming into the place occupied by the cartridge just delivered. It will be noted that the forward edge of the ejector stop 49 stands in front of the rim of the uppermost cartridge in the magazine, and so that when a shell is extracted, it will strike this ejector stop before it reaches the head of the uppermost cartridge in the magazine which would otherwise stand in the path of the ejected shell. Thus the extracted shell does not interfere or contact with the head of the uppermost shell in the magazine while being ejected.

We claim:—

1. A removable box magazine for fire arms having its front and rear walls forwardly curved and concentric and having its side-walls formed adjacent to its rear wall with concentric cartridge-head receiving channels terminating at their upper ends in forwardly and upwardly directed guides leading to feeding and loading notches the forward edges of which are forwardly and upwardly directed, and the opening between the forward portions of the upper edges of the said side-walls being narrower than the diameter of the heads of the cartridges.

2. A removable box-magazine for fire arms, having its front and rear walls forwardly curved throughout their length and concentric and having its side-walls spaced apart for the reception between them of a single column of cartridges and provided adjacent to the said rear wall with a cartridge-head-receiving channel concentric therewith and terminating at their upper ends in forwardly and upwardly directed guides leading to feeding - and - loading notches the forward edges of which are forwardly and upwardly directed and inwardly turned into the mouth of the magazine.

3. A removable box-magazine for fire arms, having its front and rear walls forwardly curved throughout their length and concentric and having its side-walls spaced apart for the reception between them of a single column of cartridges and provided adjacent to the said rear wall with a cartridge-head-receiving channel concentric therewith and extending at their upper ends above the upper ends of the said front and rear walls and formed with vertical feeding-and-loading notches the forward edges of which are forwardly and upwardly inclined to elevate the heads of the cartridges as they emerge from the upper ends of the said channel from which guides lead to said notches.

4. A removable box-magazine for firearms, having its front and rear walls forwardly curved throughout their length and concentric and having its side walls spaced apart for the reception between them of a single column of cartridges, cartridge-head-receiving channels formed upon the inner faces of the said side walls adjacent to the said rear wall and concentric therewith, guides formed upon the inner faces of the said side walls at the upper ends of the said channels to guide the cartridges forwardly and upwardly as they emerge from the upper ends of the said channels, vertical feeding-and-loading notches formed in the upper edges of the said side walls and receiving the heads of the cartridges from the said guides, the forward edges of the said notches constituting upwardly and forwardly inclined means for elevating the heads of the cartridges as they emerge from the notches.

5. A removable box-magazine for firearms, having its front and rear walls forwardly curved throughout their length and concentric and having its side walls spaced apart for the reception between them of a single column of cartridges, guides leading forwardly from the upper ends of the said side walls, vertical feeding-and-loading notches formed in the upper edges of the side-walls in advance of the said guides, the forward edges of the said notches being forwardly and upwardly inclined to lift the heads of the cartridges upon the forward edges of the said side walls.

6. A removable box-magazine for firearms, having its front and rear walls forwardly curved throughout their length and concentric and having its side-walls spaced apart for the reception of a single column of cartridges between them and their upper ends extended above the upper ends of the said front and rear walls and formed with vertical feeding-and-loading notches the forward edges of which are upwardly inclined to elevate the heads of the cartridges as they are lifted out of the mouth of the magazine.

7. A removable box-magazine for firearms, having its front and rear walls curved throughout their length and concentric and having its side-walls spaced apart for the reception of a single column of cartridges between them and the upper edges of the side walls being extended above the upper ends of the front and rear walls and shaped to form retaining-flanges overhanging the rear portion of the mouth of the magazine, vertical feeding-and-loading notches located directly in front of the said flanges, the forward edges of the said notches being forwardly and upwardly inclined to elevate the heads of the cartridges as they emerge into the said notches from the said flanges, and means located upon the inner faces of the said side walls for forwardly directing the cartridges for the entrance of their heads into the said notches.

8. A removable box-magazine for firearms, having its front and rear walls forwardly curved throughout their length and concentric and having its side walls spaced apart to receive a single column of cartridges between them and formed upon their inner faces with cartridge-head-receiving channels located adjacent to the said rear wall and concentric therewith, the rear edges of the upper ends of the side-walls being struck outwardly to form guides leading forwardly from the said channels and retaining flanges overhanging the rear portion of the mouth of the magazine and the said upper ends of the side walls being formed with vertical feeding-and-loading notches located in front of the said retaining-flanges and the forward portions of the upper ends of the side-walls forming in front of the said notches an opening narrower than the diameter of the heads of the cartridges.

9. A removable box-magazine for firearms, having its front and rear walls forwardly curved throughout their length and concentric and having its side walls spaced apart to receive a single column of cartridges between them and formed near their upper ends with follower-stops, in combination with a follower having its forward end bent downwardly and formed upon its opposite edges with shoulders co-acting with the said stops to limit the upward movement of the follower in the magazine.

10. A removable box-magazine for firearms, having its front and rear walls forwardly curved throughout their length and concentric and having its side walls formed adjacent to its rear wall with inwardly struck ribs concentric with the said front and rear walls and having cartridge-head-receiving channels from the upper ends of which the cartridges are deflected forwardly and upwardly out of the mouth of the magazine and the upper end of one of the said ribs being struck outwardly to form a magazine-positioning stop upon one of the side-walls of the magazine at the upper end thereof.

11. In a box magazine for firearms having the front and rear walls curved as described, a curved rib formed near the rear edge of the side wall for the guidance of the heads of the cartridges and further formed at the top thereof as an upwardly and forwardly sloping guide for the delivery of the cartridge heads to the extractor in combination with an extension of the said guide made by forcing in a part of the upper portion of the side walls to form an upwardly and forwardly sloping cartridge head guide edge therein.

12. In a box magazine for firearms having the front and rear walls curved as described, a follower having a downwardly projecting arm formed with lateral shoulders for coaction with an inner shoulder in the side walls of the magazine to prevent the end of the follower from rising beyond a predetermined position.

13. In a box magazine for firearms having the front and rear walls curved as described, a curved rib formed near the rear edge of each side wall for the guidance of the heads of the cartridges and further formed near the top edge of each side wall as a sloping charging guide and further having a stop and supporting shoulder formed in the side wall by the punching outward of a portion of the side wall material from the said groove.

14. In a box magazine for firearms the combination with separately formed side and end walls, said side walls having their lower edges formed with outwardly turned flanges, of a bottom formed with upwardly and inwardly turned lateral edges to clamp the side and end walls together and also to furnish finger holds for manipulating the magazine.

15. A box for a box magazine for firearms formed of four pieces of sheet metal arranged in two substantially parallel pairs, one pair being attached to the other pair by lugs formed integrally with the second pair, passing through recesses in the first pair; the said lugs being upset after assembly for riveting pieces together.

16. A box for a box magazine for firearms formed from four pieces of sheet metal, namely, two sides, a front and a back, in which the sides project rearwardly and forwardly beyond the front and back, being attached thereto by lugs formed integrally with the front and back, respectively, passing through slots in the sides, the said lugs being upset after assembly for riveting the pieces together.

17. A box for a box magazine for firearms formed of five pieces of sheet metal, namely, two sides, a front, a back and a bottom, in which the sides project rearwardly and forwardly beyond the front and back, being attached thereto by lugs formed integrally with the front and back, respectively, passing through slots in the sides, the said lugs being formed with swallow-tail ends before assembly and having these swallow-tail ends upset after assembly for riveting the pieces together; the sides having outwardly turned flanges at their lower edges and the bottom having its side edges bent upwardly and inwardly for coaction therewith for the combined purpose of holding the parts together and furnishing finger holds for manipulating the magazine.

In testimony whereof, we have signed this specification in the presence of two subscribing witnesses.

THOMAS C. JOHNSON.
FREDERICK L. HUMISTON.

Witnesses:
DANIEL H. VEADER,
ERIK S. PALMER.